US006201361B1

(12) United States Patent
Müller

(10) Patent No.: US 6,201,361 B1
(45) Date of Patent: Mar. 13, 2001

(54) HIGH-SPEED POSTAGE METER BASE

(75) Inventor: Martin Müller, Langenthal (CH)

(73) Assignee: Ascom Hasler Mailing Systems AG, Bern (CH)

( * ) Notice: Subject to any disclaimer, the term of this patent is extended or adjusted under 35 U.S.C. 154(b) by 0 days.

(21) Appl. No.: 09/368,662

(22) Filed: Aug. 5, 1999

Related U.S. Application Data

(60) Provisional application No. 60/098,584, filed on Aug. 31, 1998.

(51) Int. Cl.[7] .......... H02P 5/46

(52) U.S. Cl. .......... 318/68; 318/561; 318/573; 318/603; 318/601; 318/540

(58) Field of Search .......... 318/561, 571, 318/603, 601, 540, 68

(56) References Cited

U.S. PATENT DOCUMENTS 5,495,103 * 2/1996 Utiger et al. .......... 318/561
5,862,243 * 1/1999 Baker et al. .......... 318/561

* cited by examiner

*Primary Examiner*—Karen Masih
(74) *Attorney, Agent, or Firm*—Perman & Green, LLP; James F. McLaughlin

(57) ABSTRACT

A mail piece handler defines a paper path having a downstream direction. A first motor is mechanically coupled with the mail piece handler, and an encoder is operatively coupled with the mail piece handler. A mail piece sensor is positioned at the paper path, and a print rotor is positioned at the paper path downstream of the mail piece sensor, the print rotor having a print surface. A second motor is mechanically coupled with the print rotor, and an electronic controller is communicatively coupled with the encoder, with the mail piece sensor, and with the second motor, the controller disposed in the event of sensing of a mail piece by the mail piece sensor to control said second motor so as to cause the print surface of the print rotor to move at substantially a speed measured via the encoder.

20 Claims, 2 Drawing Sheets

HIGH-SPEED POSTAGE METER BASE

This application claims priority from U.S. provisional application No. 60/098,584 filed Aug. 31, 1998, which is incorporated herein by reference.

The invention relates generally to paper and document transport, and relates particularly to bases for postage meters (franking machines).

BACKGROUND

A typical prior art postage meter (franking machine) system has a powerful AC motor which drives all of the moving parts of the meter when a letter or other mail piece enters the paper path. The postage meter is, by definition, prepared at all times to be able to rotate so as to print postage. If it is not ready to print postage, it blocks actuation of the AC motor.

Generally the system includes a base which contains the motor or motors and contains the lower portion of the paper path, for example a number of rollers or belts (or both) and provides a level and smooth surface defining part of the paper path. The rollers or belts protrude slightly above the level, smooth surface.

Above the base, and removably mounted to the base, is the postage meter proper. The postage meter typically has a secure housing within which are found accounting registers indicative of the postage value available for printing, and a print mechanism such as a print rotor. The meter typically provides additional rollers which, together with rollers in the base, define part of the paper path.

A mechanical linkage such as a gear engagement links the upper part of the paper path (within the postage meter) with the lower part of the paper path (within the base) and with the print mechanism such as the print rotor.

It should be appreciated that while some of the upper rollers or belts that help to define the paper path may be within the meter, others of the upper rollers or belts may be provided by part of the base. Thus, as a mail piece progresses along a level paper path, it may initially have the base both above it and below it, while later it may have the meter above it and the base below it.

In such prior-art systems, as mentioned above, it is commonplace to link the moving parts so that they are all powered by a single large AC motor. A single-revolution clutch may be provided which is actuated once for each time that a mail piece arrives at the postage meter. For example, there may be a trigger in the paper path just prior to the print rotor, and when the trigger is actuated then the single-revolution clutch causes the print rotor to rotate once.

Such a system has the advantages of simplicity and long-standing use in the field. But the AC motor is heavy and consumes a lot of power, and is actually rather crude in terms of speed control. Typically the entire system is forced to start at rest, accelerate to high speed, and then decelerate back to rest. The cycle is repeated hundreds of thousands or millions of times, and the extreme nature of the cycle requires the drive train to be quite strong and heavy. The cycle is also noisy. The AC motor is typically heavy and bulky.

Another prior art approach for a postage meter is that described, for example, in U.S. Pat. No. 4,631,681 or 4,774,446. In such a system, two motors are employed, the first an AC motor that actuates the paper path, and a second motor which is a DC motor having encoder feedback, coupled with the print rotor, driven with pulse-width modulation to match the velocity of the paper path driven by the AC motor, as measured with two document sensors in the paper path as driven by the AC motor. Such a system offers some advantages over the prior art, but at the expense of requiring more than one document sensor in the paper path. Such a system also has the possible drawback that it may in fact fail to measure the velocity accurately and may drive the print rotor at a speed that is too fast or too slow relative to the speed within the AC-driven paper path.

Still another prior art approach is that described in U.S. Pat. No. 4,933,616, in which a microcomputer provides control of the speed of first and second motors, a first motor connected with a sheet transport system and a second motor connected with a print drum assembly. Such a system has the drawback that both of the motors must be of a type that can have closely controlled speed, and each motor must have driving circuitry associated with the speed control capability. This adds to the cost of the system and to its weight and complexity.

It is desirable to have a postage meter system that overcomes the drawbacks of the prior art, in which the print rotor is driven in faithful correspondence with the paper path, and in which the operation is quieter, smoother, less expensive, and less bulky than in the prior art.

SUMMARY OF THE INVENTION

A mail piece handler defines a paper path having a downstream direction. A first motor is mechanically coupled with the mail piece handler, and an encoder is operatively coupled with the mail piece handler. A mail piece sensor is positioned at the paper path, and a print rotor is positioned at the paper path downstream of the mail piece sensor, the print rotor having a print surface. A second motor is mechanically coupled with the print rotor, and an electronic controller is communicatively coupled with the encoder, with the mail piece sensor, and with the second motor, the controller disposed in the event of sensing of a mail piece by the mail piece sensor to control said second motor so as to cause the print surface of the print rotor to move at substantially a speed measured via the encoder.

DETAILED DESCRIPTION

Figure 1:
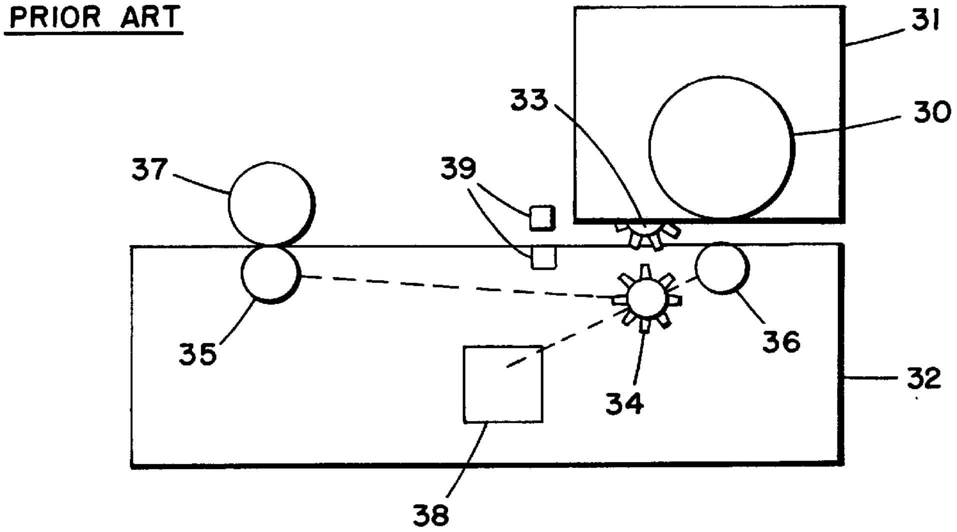
FIG. 1. PRIOR ART
FIG. 1 shows a prior-art system.

FIG. 1 shows a prior-art system. In FIG. 1, an AC motor 38 is mechanically coupled to a gear 34 and to roller 35 and optionally to roller 36, all contained within base 32. Follower 37 together with roller 35 define an intake region for the paper path, generally horizontal and to the right in FIG. 1. Postage meter or franking machine 31 is normally mounted on base 32 although it may be removed for example for inspection by postal authorities or for refilling (resetting). A gear 33 is mechanically engaged with the print rotor 30 and causes the print rotor 30 to rotate in response to rotation of gear 33. Gears 33 and 34 are positioned within their respective base 32 and meter 31 so that they are engaged with each other when the meter 31 is positioned correctly on the base 32. A sensor 39 senses arrival of a mail piece in the system and causes the AC motor 38 to start.

The system of FIG. 1 has been used for decades, and works well for its intended purpose. But it has to start and stop for each mail piece, which causes wear and tear. The AC motor is large and the mechanisms associated therewith are noisy. The speed of the transport along the paper path is not particularly well controlled and may be different from one mail piece to the next, which is undesirable in the case of a system that feeds mail pieces from a feeder. The system typically requires a single-revolution clutch in the drive train between the AC motor 38 and the print rotor 30. Such single-revolution clutches represent a maintenance concern because they can wear out, and they add to the cost and complexity of the system. Some such single-revolution clutches are also noisy.

Figure 2:
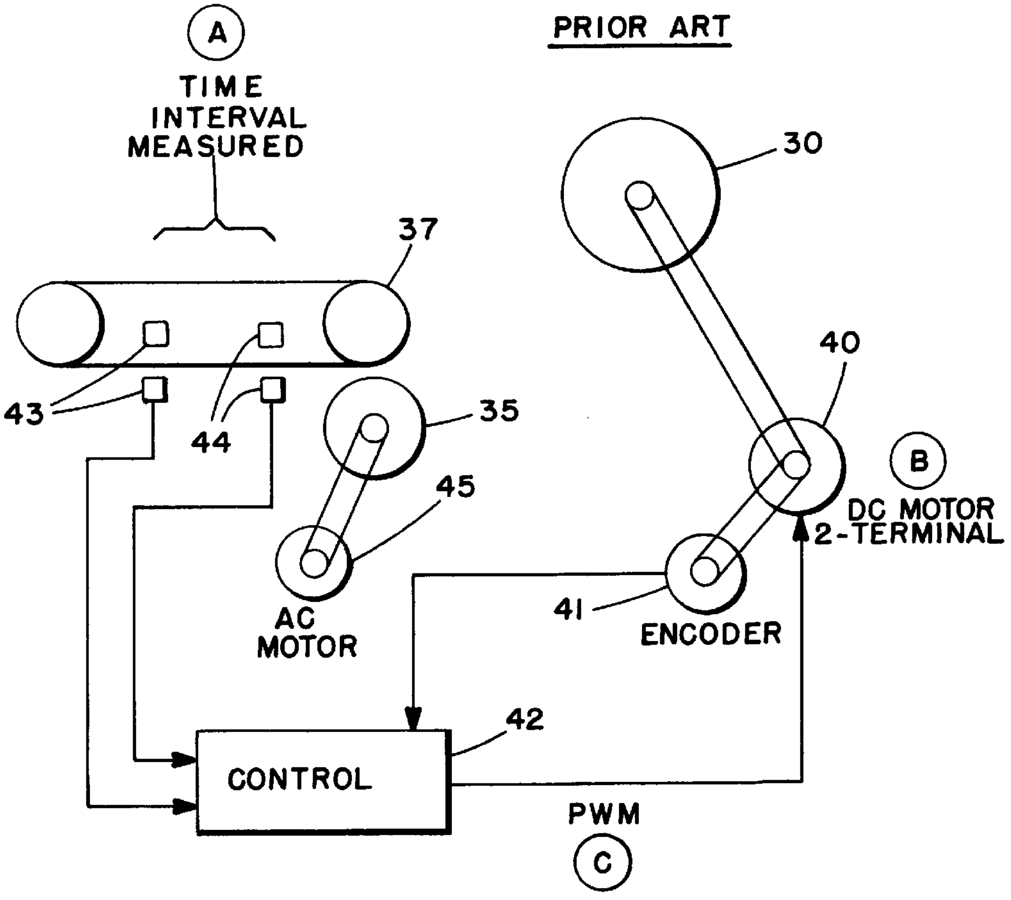
FIG. 2. PRIOR ART
FIG. 2 shows another prior-art system.

FIG. 2 shows another prior-art system, shown for example in U.S. Pat. Nos. 4,631,681 or 4,774,446. In such a system, two motors are employed, the first an AC motor 45 that actuates the paper path, and a second motor 40 which is a DC motor 40 having feedback from an encoder 41, coupled with the print rotor 30, driven with pulse-width modulation to match the velocity of the paper path driven by the AC motor 45, as measured with two document sensors 43,44. Controller 42 receives the edge triggers from the sensors 43, 44 from which a crude approximation of the mail piece velocity may be readily calculated, and then in a well-known way, the velocity at the print rotor 30 is measured via encoder 41. The difference between the actual velocity (measured via the encoder 41) and the desired velocity (e.g. the velocity measured via the sensors 43, 44) is an input to a conventional control system which adjusts the pulse-width-modulated power fed to the DC motor. Such a system offers some advantages over the prior art, but at the expense of requiring more than one document sensor 43, 44 in the paper path. Such a system also has the possible drawback that it may in fact fail to measure the velocity accurately and may drive the print rotor 30 at a speed that is too fast or too slow. For example, the mail piece may speed up or slow down after it has passed the sensors 43, 44 and thus be traveling at a different speed than the edge of the rotor 30. As another example, the speed measured by the sensors 43, 44 is at best an average of the speed during the time in which the leading edge of the mail piece passes therebetween.

Figure 3:
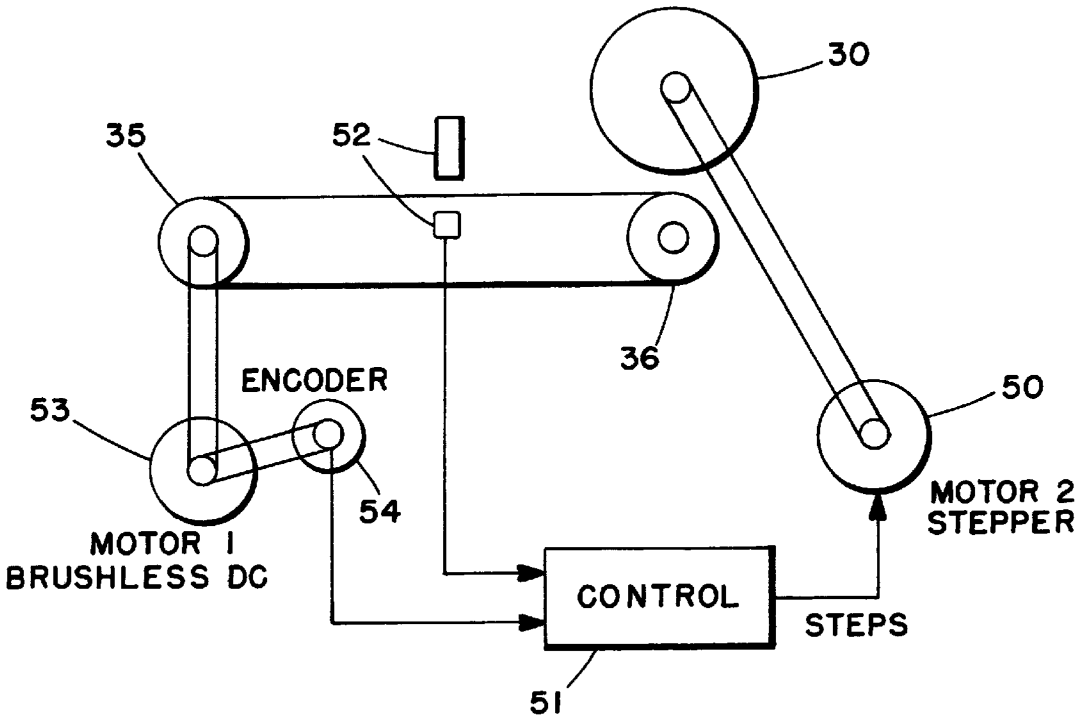
FIG. 3 shows an embodiment of the invention.

FIG. 3 shows an embodiment of the invention. In this embodiment, a paper path is defined by rollers such as rollers 35, 36, referred to generally as mail piece handlers. The mail piece handlers can be belts or rollers and the choice of particular types of mail piece handlers is not critical to the invention. These rollers move under the influence of a motor, preferably a brushless DC motor 53 which is mechanically coupled therewith through a drive train. An encoder 54, mechanically coupled with the drive train of the DC motor 53, provides reliable velocity information regarding the paper path. Importantly, the measured velocity at the paper path is correct on a more or less instantaneous basis, that is, what is measured is an instantaneous velocity rather than a velocity averaged over a longer interval. While the term "encoder" is used, it will be appreciated that other speed sensors could be used, such as resolvers, and the term "encoder" preferably encompasses such other sensors coupled with the paper path mail piece handler. While the exemplary motor is a brushless DC motor, it should appreciate that other types of motors could be used. The motor 53 is free-running at a predetermined speed; stated differently, in a preferred embodiment there is no feedback controlling the speed. Because (in a preferred embodiment) there is no control loop, the effective speed of movement of a mail piece in the paper path coupled with the motor 53 is or can be a function of the load from the mail piece.

When a mail piece enters the system it is sensed by a trigger 52, which could optionally be the optical sensor set forth in the above-mentioned U.S. Pat. No. 5,495,103 entitled *Optical mail piece sensor for postage meter*, assigned to the same assignee as the present application. Alternatively the mail pieces can be sensed by means of a mechanical detector such as a release lever. The sensor is preferably a phototransistor juxtaposed with a light-emitting diode. The base is controlled by an electronic signal which is integrated into a plug that provides an electrical connection between the base and the meter. This connection is used to tell the base whether the meter is ready or not. The meter will thus be largely unchanged from meters used in prior art systems, except for the need to generate this signal.

The trigger signal from the trigger sensor in the base prompts a controller 51 to actuate the stepper motor 50, taking into account the velocity of the mail piece through the paper path as measured with the encoder 54. Thus print rotor 30 is driven by the stepper motor 50. The stepper motor 50 is at least a three-terminal device, and would generally have four terminals. Speed control is accomplished simply by controlling (via controller 51) the timing of the pulses to the stepper motor 50, responsive to the encoder 54. The stepper motor 50 is selected so as to have enough torque to overcome all loads, so that there is no slippage, that is, so that there is no need for any feedback from the stepper motor 50 or its drive train by which it is mechanically coupled with the print rotor 30. There is desirably a sensor or two that can tell if the rotor 30 is in the "home" position, but otherwise no sensors are needed with respect to motion of the print rotor 30. The stepper motor is driven so as to accomplish one rotation (one franking imprint) when the letter or other mail piece is detected by its sensor 52.

It will be appreciated that there is no need to keep motor 53 turning indefinitely. In general the motor 53 is stopped some time after it is started, and preferably it is stopped after some timeout from the event of sensing a mail piece. It may also happen that a number of mail pieces arrive in succession, in which case the motor 53 may be kept moving until some timeout after the arrival of the last mail piece.

It will also be appreciated that while the event of the arrival of a mail piece will prompt starting the motor 53, there are other events that would preferably also prompt starting the motor 53. For example, when the system is switched on, it is desirable to start the motor 53, since there may have been a mail piece in the system during the immediately preceding loss of power. Likewise, if the system has a sleep mode (for example, a low-power mode for power conservation), then it is desirable to start the motor 53 upon revival from the sleep mode.

In a system such as that just described, the letter speed through the meter can thus be set by a user within a particular range. For example, it may be arranged that the user can select any of several predetermined speeds for the motor 53. The system including the encoder 54, the controller 51, and the motor 50 is able to accommodate any of several such speeds for the motor 53, and in particular is able to accommodate differing speeds resulting from loads presented by different mail pieces.

Those skilled in the art will have no difficulty in devising obvious variations and improvements on the invention set forth herein, all of which are of course considered to be within the invention as defined by the claims which follow. For example, those skilled in the art will appreciate that the teachings of the invention could likewise give their benefits to systems that apply a postage indicium to a mail piece by some means other than a rotating print rotor.

What is claimed is:

1. A franking system comprising:

a mail piece handler defining a paper path having a downstream direction;

a first motor mechanically coupled with the mail piece handler;

an encoder operatively coupled with the mail piece handler;

a mail piece sensor positioned at the paper path;

a print rotor positioned at the paper path downstream of the mail piece sensor, said print rotor having a print surface;

a second motor mechanically coupled with the print rotor; and an electronic controller communicatively coupled with the encoder, with the mail piece sensor, and with the second motor, said controller disposed in the event of sensing of a mail piece by the mail piece sensor to control said second motor so as to cause the print surface of the print rotor to move at substantially a speed measured via the encoder.

2. The system of claim 1 wherein the print rotor is in a secure housing separable from a base housing, said base housing containing the first motor and the second motor.

3. The system of claim 1 wherein the controller starts the first motor in response to the event of sensing of a mail piece by the mail piece sensor and stops the first motor thereafter.

4. The system of claim 3 wherein the stopping of the first motor comprises stopping the first motor after a timeout from the event of sensing a mail piece by the mail piece sensor.

5. The system of claim 3 wherein the speed of the first motor is not controlled by the controller.

6. The system of claim 1 wherein the controller starts the first motor when the system is switched on or revived from a sleep mode.

7. The system of claim 1 wherein the speed of the first motor is preset by the controller at one of a number of selectable levels, but is not controlled with feedback.

8. The system of claim 1 wherein the second motor is a stepper motor having a torque, said stepper motor selected so that its torque is sufficient to drive the print rotor substantially without slippage.

9. The system of claim 1 wherein the first motor is a brushless DC motor.

10. The system of claim 1 wherein the mail piece sensor is a phototransistor juxtaposed with a light-emitting diode.

11. A method for operation of a franking system, said franking system having a mail piece handler defining a paper path, said mail piece handler driven by a first motor and having a velocity along the paper path, said franking system also having a print rotor with a print surface, the print rotor mechanically coupled with a second motor, the method comprising the steps of:

detecting an arrival of a mail piece along the paper path;

measuring the velocity of the mail piece handler;

driving the second motor so that the velocity of the print surface substantially matches that of the mail piece handler.

12. The method of claim 11 further comprising the step, performed before the measuring step, of starting the first motor in response to an event of sensing of a mail piece by a mail piece sensor;

and further comprising the step, performed after the driving step, of stopping the first motor.

13. The method of claim 12 wherein the step of stopping the first motor comprises stopping the first motor after a timeout from the event of sensing of a mail piece.

14. A postage meter system comprising:

a mail piece handler at least partially forming a mail piece path, the mail piece handler being adapted to move a mail piece in the mail piece path;

a first driver operably connected to the mail piece handler for driving the handler;

a sensor connected to the mail piece handler for sensing movement of the mail piece handler;

a controller connected to the sensor;

a second driver connected to the controller; and a movable printing device operably connected to the second driver;

wherein the controller controls the second driver based, at least partially, upon input from the sensor of the sensed movement of the mail piece handler such that speed of the printing device is controlled relative to speed of the mail piece handler.

15. A postage meter system as in claim 14 wherein the sensor comprises an encoder connected to the first driver, wherein the sensor senses movement of the mail piece handler by sensing movement of the first driver.

16. A postage meter system as in claim 15 further comprising a single mail piece sensor in the mail piece path, the mail piece sensor being connected to the controller.

17. A postage meter system as in claim 14 wherein the second driver comprises a stepper motor.

18. A postage meter system as in claim 14 wherein the first driver comprises a motor and a drive train, and wherein the motor is connected to the mail piece handler by the drive train.

19. A postage meter system as in claim 18 wherein the sensor is connected to the motor, wherein the sensor senses movement of the mail piece handler by sensing movement of the motor.

20. A postage meter system as in claim 14 wherein the sensor senses speed of the mail piece handler.

* * * * *